(No Model.)

U. W. STRACENER.
ANIMAL POKE.

No. 475,091. Patented May 17, 1892.

WITNESSES_
Geo. E. Frick.
R. Fitzgerald.

INVENTOR_
Upton W. Stracener
per
Lehmann & Pattison
attys

UNITED STATES PATENT OFFICE.

UPTON W. STRACENER, OF BETTIE, TEXAS, ASSIGNOR OF ONE-HALF TO T. J. NELSON, OF SAME PLACE.

ANIMAL-POKE.

SPECIFICATION forming part of Letters Patent No. 475,091, dated May 17, 1892.

Application filed September 21, 1891. Serial No. 406,414. (No model.)

*To all whom it may concern:*

Be it known that I, UPTON W. STRACENER, of Bettie, in the county of Upshur and State of Texas, have invented certain new and useful Improvements in Animal-Pokes; and I do hereby declare the following to be a full, clear, and exact description of the invention, such as will enable others skilled in the art to which it pertains to make and use it, reference being had to the accompanying drawings, which form part of this specification.

My invention relates to an improvement in animal-pokes; and it consists in certain novel features of construction, which will be fully described hereinafter, and more particularly referred to in the claims.

The object of my invention is to construct a device which may be secured to horses, cattle, and other animals, and which will effectually prevent fence-jumping, while at the same time allow the animal free use of his head and limbs, doing away with any tendency to cramp the wearer.

Figure 1:
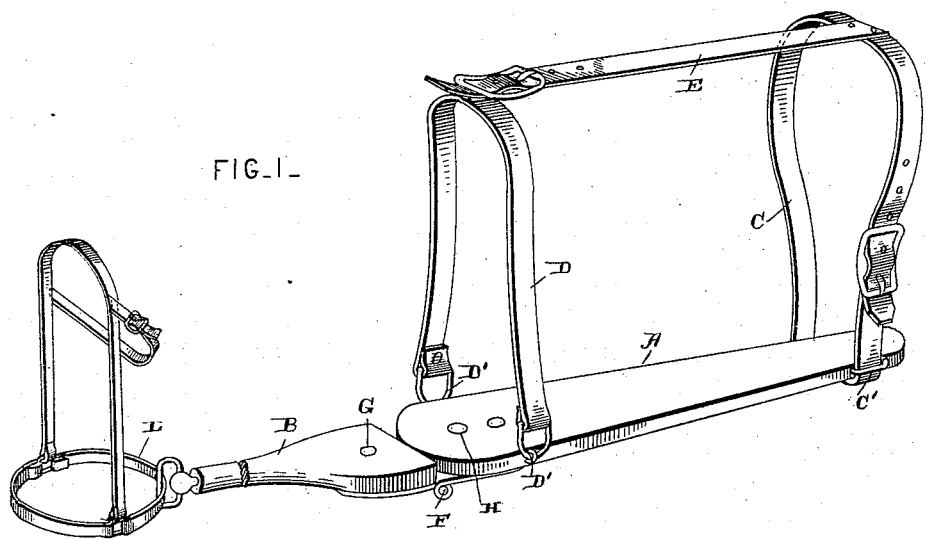
Figure 2:
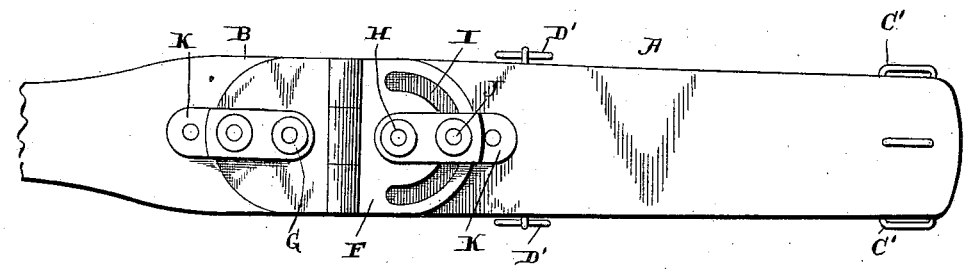

Referring to the accompanying drawings, Figure 1 is a perspective view of my improved device. Fig. 2 is a bottom view of the same.

A and B represent two horizontal bars, which are hinged together at their meeting ends. The bar A is secured beneath the breast of the animal by means of the straps C and D, which encircle the animal's body and which are connected at their upper sides by the cross-strap E. The strap C is secured to the bar A by means of staples C', as shown, while the strap D is preferably connected to the said bar by the rings D', thus allowing the forward end of the bar A a slight swinging movement. In this manner the bar A is supported in a horizontal position beneath and extends parallel with the animal's body with its forward end projecting between the animal's front legs. The bar N is hinged to this forwardly-projecting end of the bar A, and at the outer end of the bar B is the halter L, which is worn by the animal on his head. Thus it will be seen that the bar B extends in front of the animal's breast and immediately beneath his neck and head.

F represents the connecting-hinge, to the forward end of which the bar B is secured by a pivot G. To the rear portion of the hinge is connected the bar A by means of the pivot H. The rear portion of the hinge is preferably constructed with a curved slot I, as shown, which enables the said rear portion to move around a stop J, which projects from the under side of the bar A. By this means the movement of the said bar on the hinge is limited to the length of the slot.

The pivots G H are strengthened in their extended positions by the strips K, which are secured at one end to the outer ends of the said pivots, and at their opposite ends to the bars B A, respectively.

By means of the pivotal connection with the hinge the bars A B are free to turn to either side, and thus conform to any position the animal may wish to assume. As the inner ends of the bars come in contact when they are in a horizontal position, and as the bar A is secured to the animal's body, it is evident that the bar B cannot be raised above a horizontal line, thus holding the animal's head down and preventing him from jumping the fence.

Having thus described my invention, I claim—

1. In a poke, the combination, with bar A and a means for suspending it beneath the animal's body and the bar B, which is secured at its outer end to the animal's head, of a hinge to the opposite side of which the adjacent ends of the said bars are pivoted, substantially as shown and described.

2. In a poke, the combination, with bar A, which is suspended beneath the animal's body, of a hinge pivoted to the forward end of the said bar and which is formed with a curved slot extending around its pivotal point, a stop on bar A, which passes through said slot, and bar B, secured to the projecting end of the hinge and which is secured at its outer end to the animal's head, substantially as shown and described.

3. In a poke, the combination, with the bar A, adapted to be suspended beneath an animal's body, and the bar B, which is adapted to be supported at its outer end by the animal's head, of a hinge, pivots H G, which connect the adjacent ends of the bars to the opposite sides of the hinge, and strips K, secured at their outer ends to the bars A B, respectively, and extending inward over the hinge sides and secured to the said pivots H G, substantially as shown and described.

In testimony whereof I affix my signature in presence of two witnesses.

UPTON W. STRACENER.

Witnesses:
T. C. MITCHELL,
W. B. STRONG.